US006963405B1

(12) United States Patent
Wheel et al.

(10) Patent No.: US 6,963,405 B1
(45) Date of Patent: Nov. 8, 2005

(54) LASER COUNTER-MEASURE USING FOURIER TRANSFORM IMAGING SPECTROMETERS

(75) Inventors: Peter J. Wheel, Fort Wayne, IN (US); Loren M. Woody, Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/894,216

(22) Filed: Jul. 19, 2004

(51) Int. Cl.[7] .................................................. G01B 9/02
(52) U.S. Cl. ...................................................... 356/456
(58) Field of Search ............................... 356/451, 456, 356/307, 457, 453, 454; 250/339.07, 339.08

(56) References Cited

U.S. PATENT DOCUMENTS 3,883,436 A 5/1975 Fletcher
3,989,897 A * 11/1976 Carver ...................... 381/94.3
4,009,939 A 3/1977 Okano
4,095,900 A * 6/1978 Murphy et al. ............. 356/456
4,128,337 A * 12/1978 Zehnpfennig ............... 356/456
4,136,954 A * 1/1979 Jamieson .................... 356/456
4,645,300 A 2/1987 Brandstetter et al.
5,192,980 A 3/1993 Dixon et al.
5,267,188 A 11/1993 Pape et al.
5,377,003 A 12/1994 Lewis et al.
5,491,552 A 2/1996 Knüttel
5,495,334 A * 2/1996 Nagoshi et al. ............. 356/456
5,528,368 A * 6/1996 Lewis et al. ................ 356/456
5,539,518 A 7/1996 Bennett
5,581,085 A 12/1996 Reffner et al.
5,777,736 A * 7/1998 Horton ....................... 356/456
5,786,893 A 7/1998 Fink et al.
5,841,139 A 11/1998 Sostek et al.
6,687,007 B1 * 2/2004 Meigs ........................ 356/456

* cited by examiner

*Primary Examiner*—Samuel A. Turner
(74) *Attorney, Agent, or Firm*—RatnerPrestia

(57) ABSTRACT

In an imaging system providing an image of a target of interest, a method of reducing interference from a laser beam includes the steps of: (a) receiving optical energy from the target of interest and the laser beam; (b) forming an interferogram of spectral energy, at each spatial position of an image, based on the optical energy received in step (a); (c) detecting the interferogram of spectral energy, at each of the spatial positions, to provide a corresponding spectral band of intensity values; (d) selecting an intensity level in the spectral band, detected in step (c), that is greater than a predetermined value, and reducing the selected intensity level; and (e) forming an image of the target of interest, after reducing the selected intensity level of step (d).

23 Claims, 19 Drawing Sheets

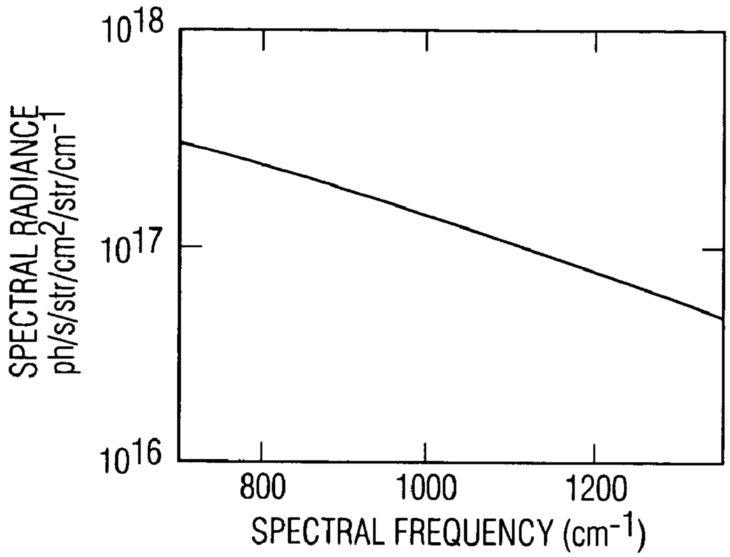
FIG. 3A
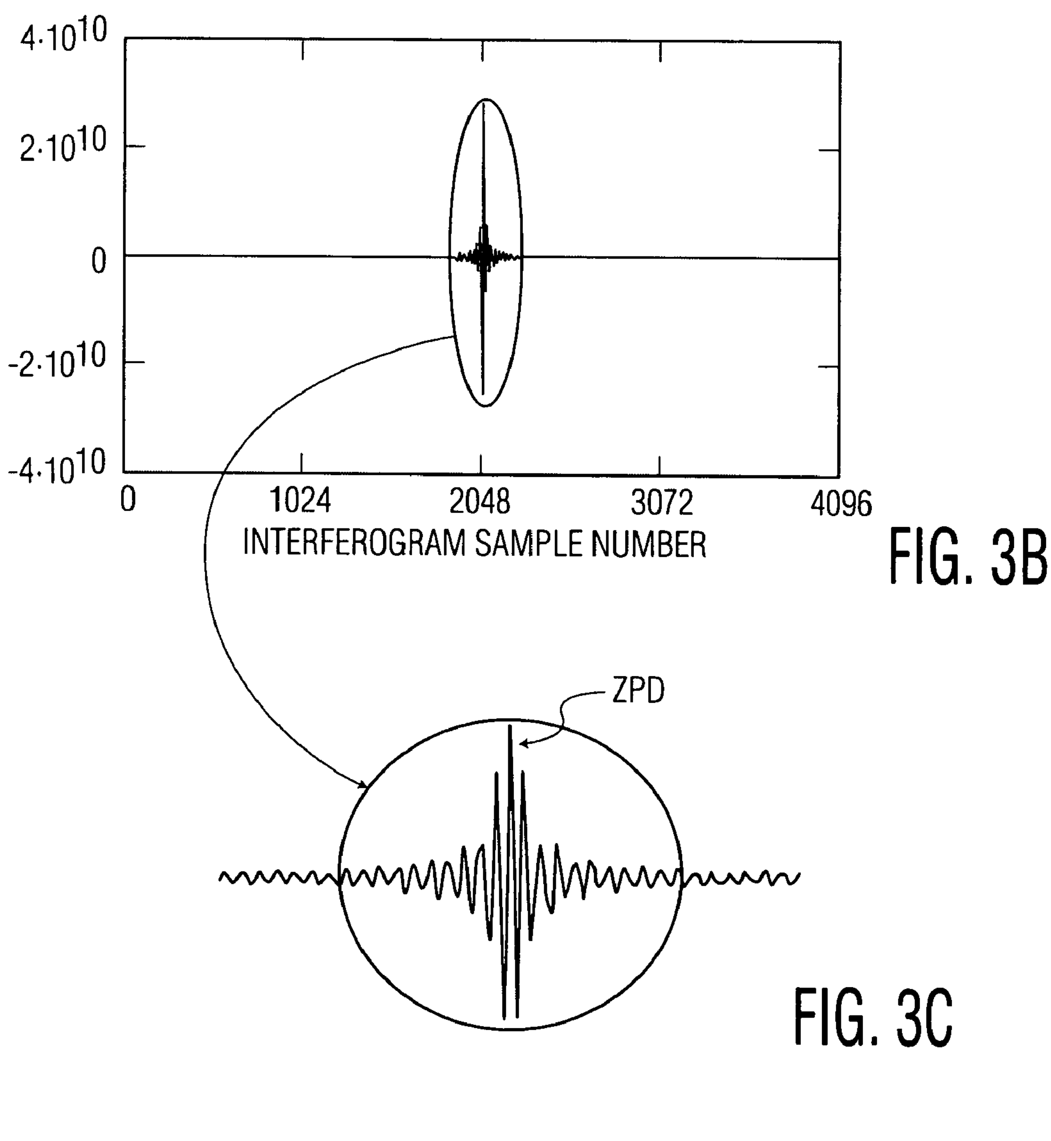
FIG. 3B
FIG. 3C

LASER COUNTER-MEASURE USING FOURIER TRANSFORM IMAGING SPECTROMETERS

FIELD OF THE INVENTION

The present invention relates, in general, to a system and method for reducing interference from unwanted laser radiation into an imager. More specifically, the present invention relates to counter-measures, using a Fourier transform spectrometer, to prevent a CW laser beam or a pulsed laser beam from saturating an imager, or any optical collection system.

BACKGROUND OF THE INVENTION

Laser energy incident upon an imaging system leads to various levels of image artifacts, up to and including complete blanking or washout of the collected image. This is due to laser energy scattered off optical surfaces and spread across the detecting focal plane of the imager. In addition, the high intensity of the laser energy incident upon the focal plane may lead to saturation artifacts, such as blooming or bleeding in the detection device.

In an exemplary scenario, an imager disposed in an aircraft may be is collecting radiation and providing video images of a target of interest. As a counter-measure against the imager, a laser beam may be aimed at the focal plane array (FPA) of the imager to jam the imager and render it useless. The laser radiation may be scattered across the focal plane array, leading to a saturated image and an inability of the imager to distinguish between the target and features of the target.

The present invention provides a system and method for processing the unwanted laser energy, removing the laser energy, and reconstructing the scene image information.

SUMMARY OF THE INVENTION

To meet this and other needs, and in view of its purposes, the present invention provides a system for imaging an object of interest. The system includes an optical detector for providing an output signal, in response to detecting the object of interest; a spectrometer, disposed between the object of interest and the optical detector for providing interferograms of the object of interest to the optical detector; and a processor for processing the output signal from the optical detector. The spectrometer is configured to provide interferograms of an interfering signal, and the processor is configured to reduce a level of the interfering signal, based on the interferograms of the interfering signal and the object of interest. The processor may include a Fourier transform module for converting the output signal provided by the optical detector into a spectral band of data, and a notching module for notching a region of the spectral band of data, the region including the interfering signal. The processor may include a peak detector for detecting an amplitude level in the spectral band of data that is greater than a predetermined threshold value. The notching module may notch the region of the spectral band of data, after the peak detector detects the amplitude level exceeding the predetermined threshold value. The processor may also include a spectral recombination module for integrating the spectral band of data into a single panchromatic intensity.

Another embodiment of the invention provides a method of reducing interference from a laser beam. The method includes the steps of: (a) receiving optical energy from a target of interest and the laser beam; (b) forming an interferogram of spectral energy, at each spatial position of an image, based on the optical energy received in step (a); (c) detecting the interferogram of spectral energy, at each of the spatial positions, to provide a corresponding spectral band of intensity values; (d) selecting an intensity level in the spectral band, detected in step (c), that is greater than a predetermined value, and reducing the selected intensity level; and (e) forming an image of the target of interest, after reducing the selected intensity level of step (d). Step (b) may include forming an interferogram of spectral energy at each spatial position of a focal plane array (FPA), and step (e) may include forming the image at each of the spatial positions of the FPA. After detecting the interferogram of spectral energy, the method may Fourier-transform the interferogram into the spectral band of intensity values. Step (d) may include peak detecting the intensity level in the spectral band, and notching out the detected intensity level in the spectral band. Step (d) may also include interpolating between values of the spectral band disposed at opposite ends of the notched intensity level.

Yet another embodiment of the invention is a method of providing counter-measures against an interfering optical source. The method includes the steps of: (a) receiving first energy from a desired optical source and second energy from an interfering optical source; (b) constructing an interferogram from the first energy and second energy; (c) detecting the second energy based on the constructed interferogram; and (d) separating the detected second energy from the first energy. Step (d) may include performing an inverse Fourier transform on the constructed interferogram to obtain a spectral region of the second energy, and removing the spectral region of the second energy using a notch filter. After removing the second energy, the method interpolates across the spectral region to reconstruct spectral intensities of the first energy, and outputs the reconstructed spectral intensities of the first energy, as a desired signal output.

It is understood that the foregoing general description and the following detailed description are exemplary, but not restrictive, of the invention.

BRIEF DESCRIPTION OF THE DRAWING

The invention is best understood from the following detailed description when read in connection with the accompanying drawing. Included in the drawing are the following figures:

FIGS. 3A–3C are graphical plots collectively showing a transformation from an input spectral radiance of a target of interest (FIG. 3A) into an interferogram (FIGS. 3B, 3C) constructed by a spectrometer used in the imaging system of FIG. 1, in accordance with an embodiment of the present invention;

Figure 1:
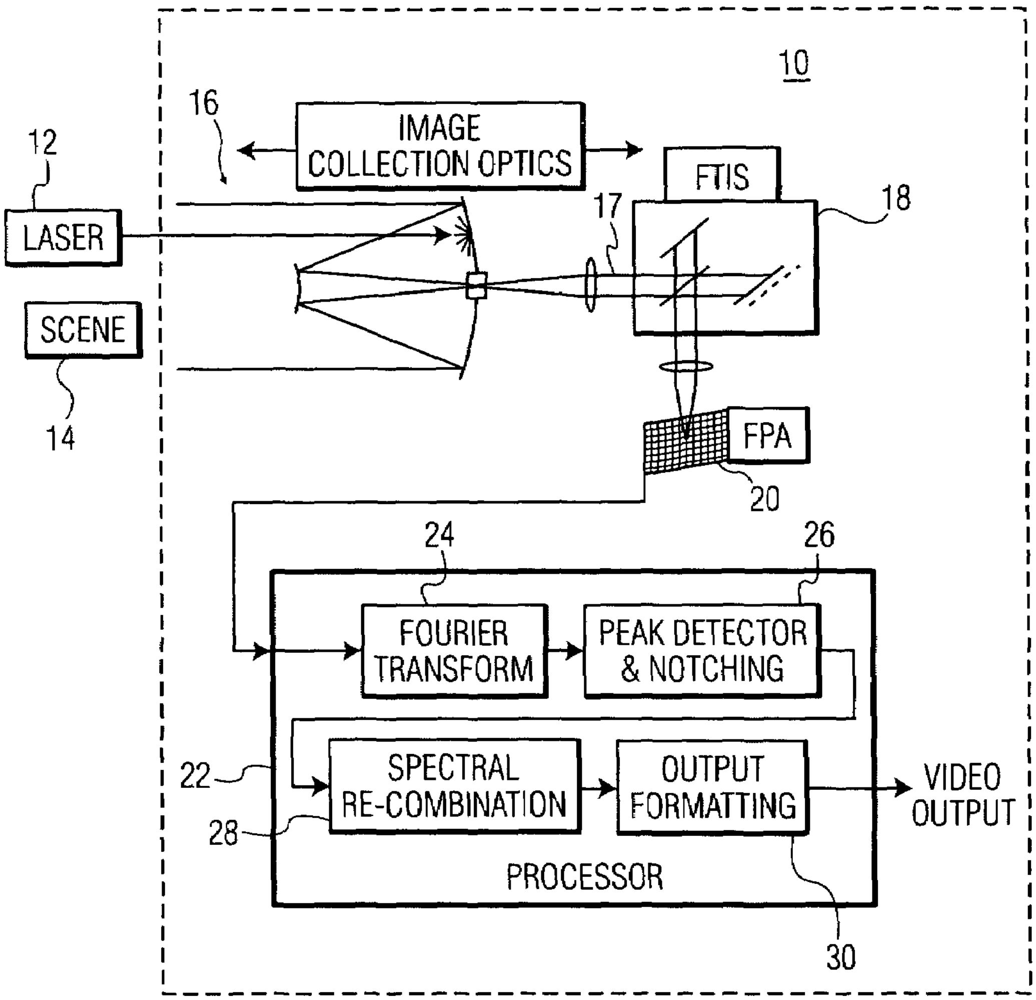
FIG. 1 is a pictorial representation of an imaging system for reducing or eliminating interference from unwanted CW laser illumination, in accordance with an embodiment of the present invention.
Figure 4:
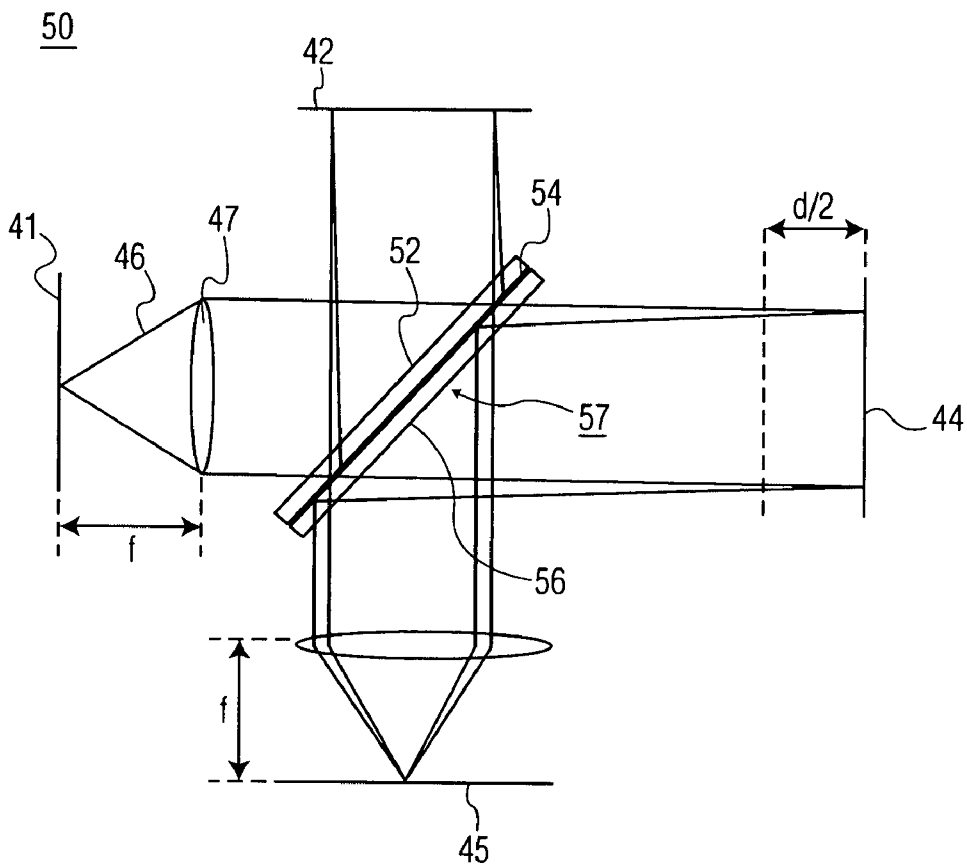
FIG. 4 is a pictorial representation of another exemplary spectrometer based on a Michelson interferometer configuration, including a compensated beam splitter, as used in the imaging system of FIG. 1, in accordance with an embodiment of the present invention.
Figure 6A:
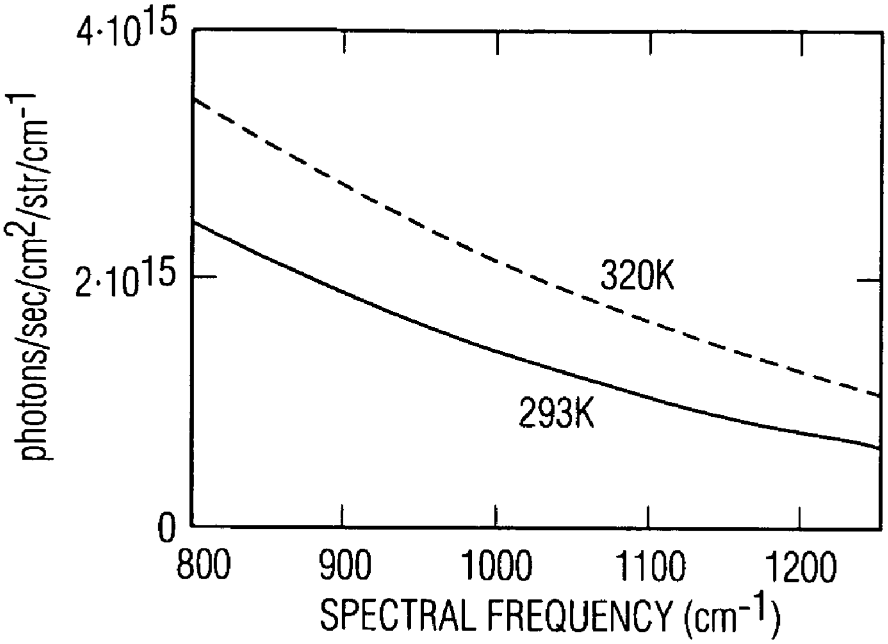
Figure 6B:
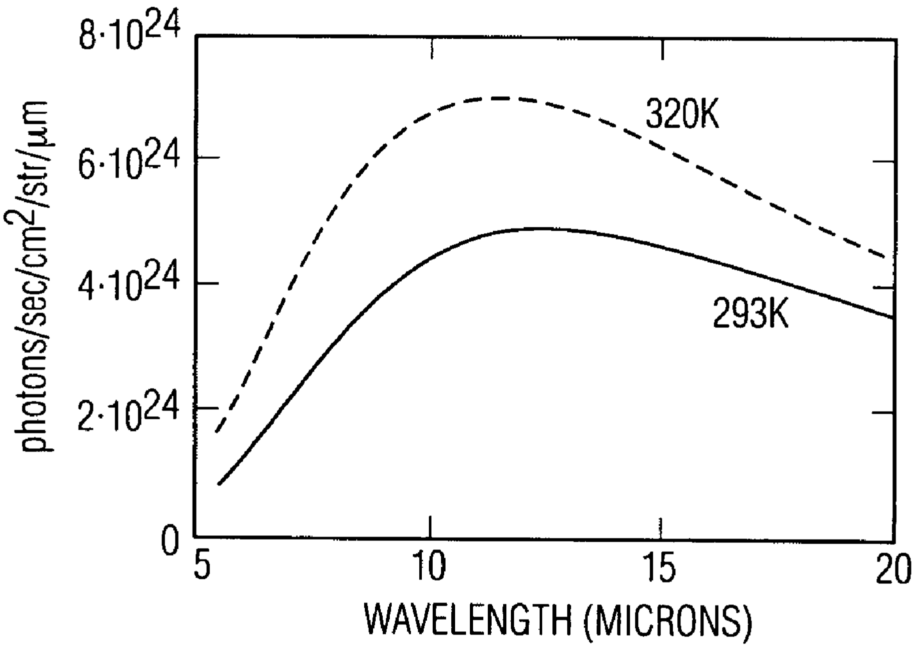
Figure 7:
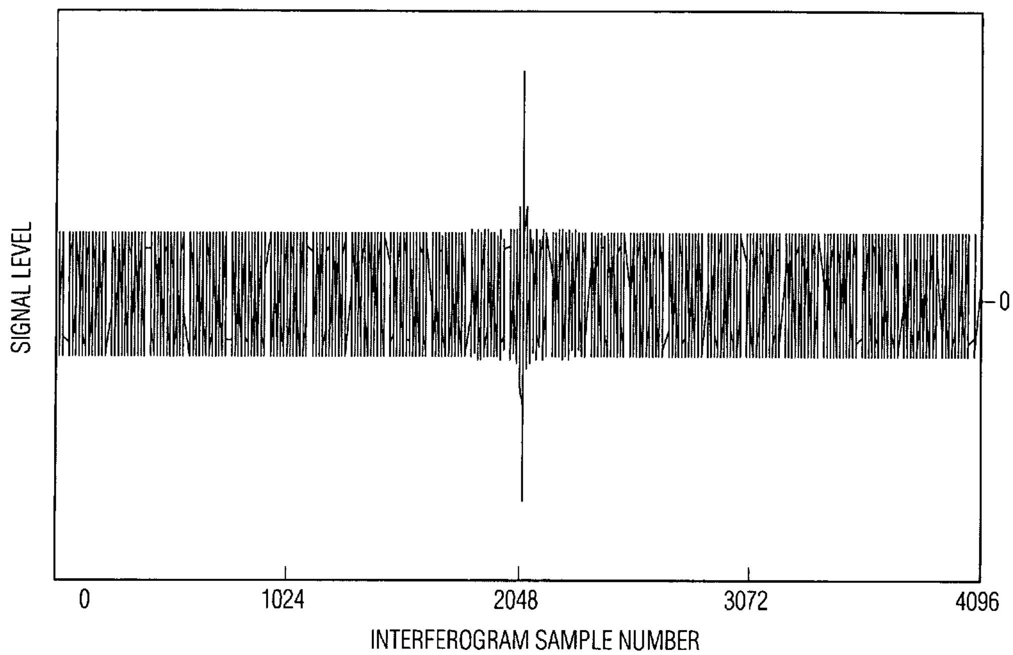
Figure 9A:
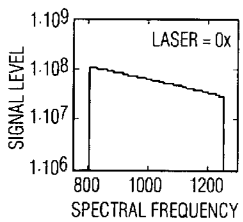
Figure 9B:
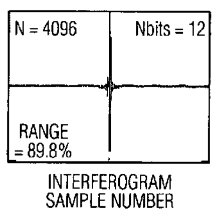
Figure 9C:
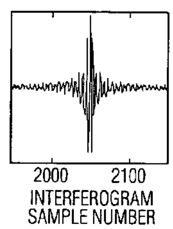
Figure 9D:
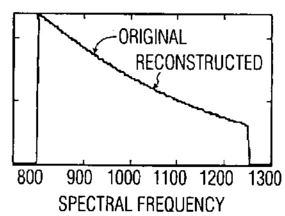
Figure 9E:
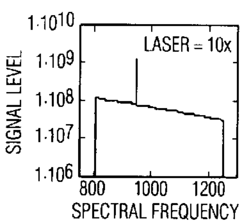
Figure 9F:
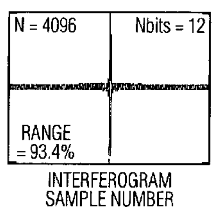
Figure 9G:
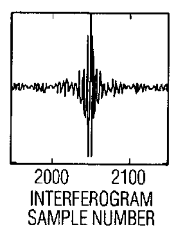
Figure 9H:
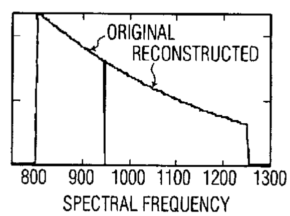
Figure 9I:
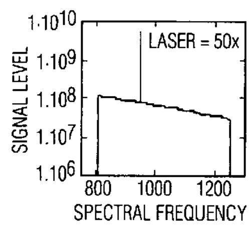
Figure 9J:
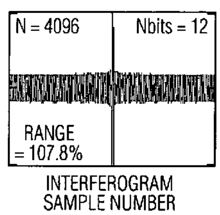
Figure 9K:
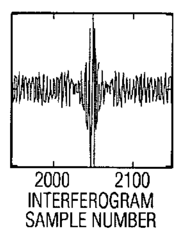
Figure 9L:
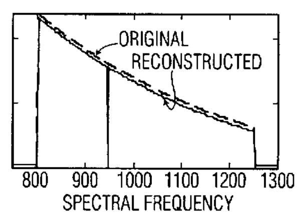
Figure 9M:
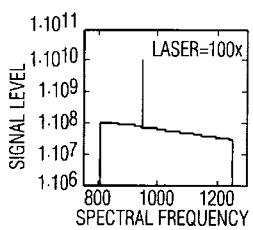
Figure 9N:
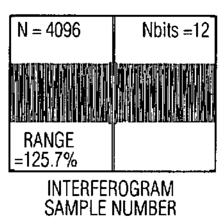
Figure 9O:
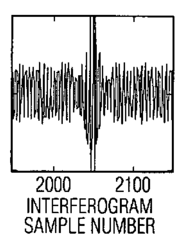
Figure 9P:
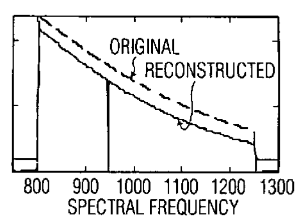
Figure 10:
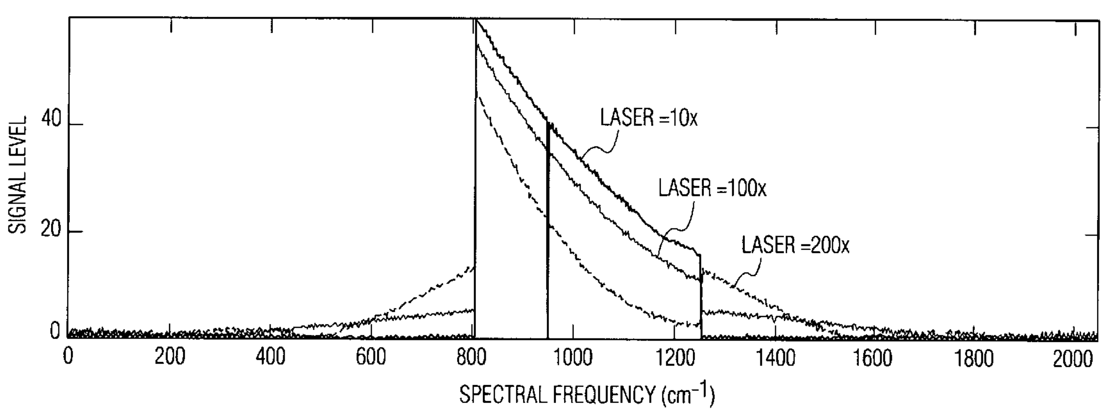
Figure 14:
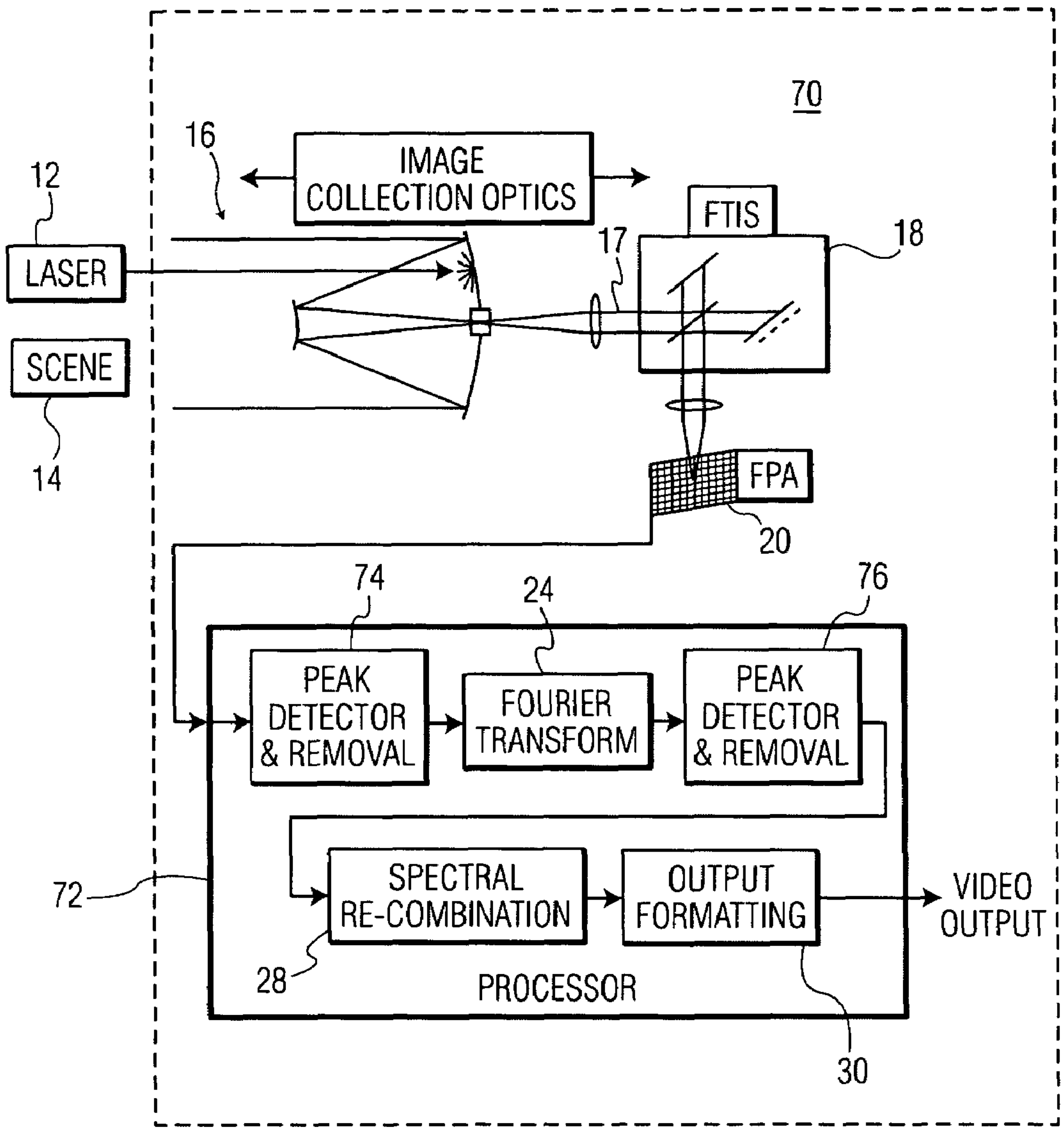
Figure 15A:
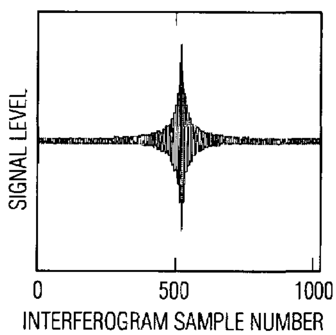
Figure 15B:
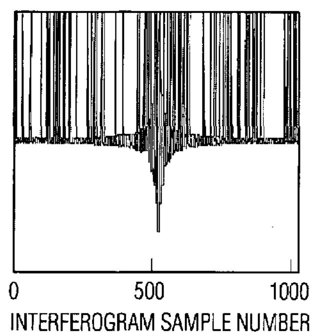
Figure 15C:
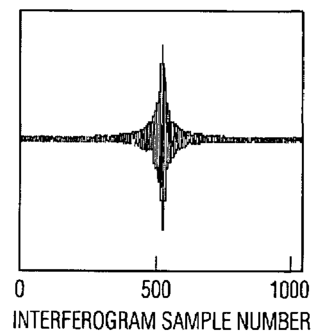
Figure 15D:
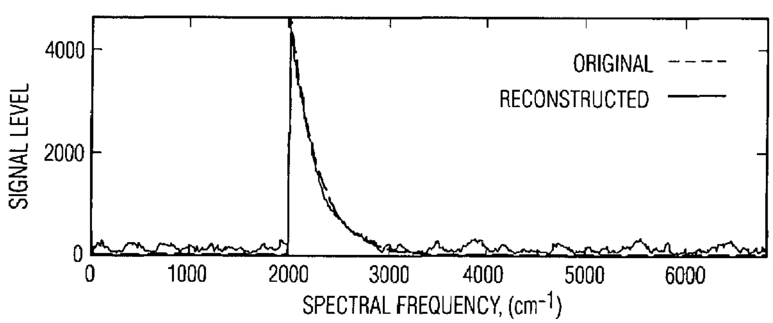

(interferogram samples shown in FIG. 5B) and the compensated spectrometer of FIG. 4 (interferogram samples shown in FIG. 5A), in accordance with an embodiment of the present invention;

FIGS. 6A–6B are graphical plots of infrared black body spectral distributions used as an example of a target of interest for detection by the imaging system of FIG. 1, in accordance with an embodiment of the present invention;

FIG. 7 is a graphical plot of signal level intensity versus interferogram sample number, showing the effect of a monochromatic source (interfering laser) on a spectrometer, as used in the imaging system of FIG. 1, which produces a nearly pure cosine in the interferogram and uniformly spreads the laser energy across all of the interferogram samples, in accordance with an embodiment of the present invention;

FIGS. 8A–8D are graphical plots showing the effectiveness of the imaging system of FIG. 1 when forming a reconstructed signal (shown in FIG. 8D) based on input incident energy of a target of interest and an interfering laser (shown in FIG. 8A), in accordance with an embodiment of the present invention;

FIGS. 9A–9P are graphical plots showing the effectiveness of the imaging system of FIG. 1 when forming output reconstructed signals (shown in FIGS. 9D, 9H, 9L and 9P) after being subjected, respectively, to input incident energies of a target of interest and varying interfering laser intensities (shown in FIGS. 9A, 9E, 9I and 9M), in accordance with an embodiment of the present invention;

FIG. 10 is a graphical plot of intensity versus spectral frequency, showing spreading of input spectral energy from a central region to side regions, as the laser intensity is increased and the target of interest intensity is maintained at a constant level;

FIGS. 11A–11L are graphical plots showing the effectiveness of the imaging system of FIG. 1 when forming output reconstructed signals (shown in FIGS. 11D, 11H and 11L) after being subjected, respectively, to input incident energies of a target of interest and an interfering laser of constant intensity (shown in FIGS. 11A, 11E and 11I), and the imaging system having variable number of bits in its analog-to-digitai conversions (shown in FIGS. 10B, 11F and 11J), in accordance with an embodiment of the present invention;

FIGS. 12A–12L are graphical plots of the effectiveness of the imaging system of FIG. 1 when forming output reconstructed signals (shown in FIGS. 12D, 12H and 12L) after being subjected, respectively, to input incident energies of a target of interest and an interfering laser (shown in FIGS. 12A, 12E and 12I), and the imaging system having varying numbers of interferogram samples (shown in FIGS. 12B, 12F and 12J), in accordance with an embodiment of the present invention;

FIGS. 13A–13L are graphical plots showing the effectiveness of the imaging system of FIG. 1 when forming output reconstructed signals (shown in FIGS. 13D, 13H and 13L) after being subjected, respectively, to input incident energies of a target of interest and an interfering laser (shown in FIGS. 13A, 13E and 13I), in accordance with an embodiment of the present invention;

FIG. 14 is a pictorial representation of an imaging system for reducing or eliminating interference from unwanted pulsed laser illumination, in accordance with another embodiment of the present invention;

FIG. 15A is a graphical plot of an interferogram showing the spectral distribution of a scene or a target of interest;

FIG. 15B is a graphical plot of an interferogram showing the spectral distribution of the scene of FIG. 15A being corrupted by a high pulse repetition frequency (PRF) laser signal;

FIG. 15C is a graphical plot of spectral distribution after removal of saturated interferogram samples caused by the high PRF laser signal of FIG. 15B; and FIG. 15D is a spectral plot showing similarity between the original scene of FIG. 15A and the reconstructed scene effectively produced by an embodiment of the present invention.

DETAILED DESCRIPTION OF THE INVENTION

Referring to FIG. 1, there is shown an imaging system for reducing or eliminating interference from unwanted laser illumination into the imaging system, the system generally designated as 10. Imaging system 10 includes image collection optics 16, Fourier transform imaging spectrometer (FTIS) 18, focal plane array (FPA) 20 and processor 22.

Light from a target of interest, for example light from scene 14, is directed toward the image collection optics, which may include a telescopic lens and a collimator lens. Collimated beam 17, formed by the collimator lens, is then directed into FTIS 18. As will be explained, FTIS 18 converts the incoming scene energy into interferograms, at each point of the imaging field. These interferograms, which are representations of the output spectrum of the image, at each point of the imaging field, are directed to a two-dimensional array detector, for example FPA 20.

Since the interferograms represent a Fourier transform of the spectral energy, the collected information may be plotted as a data cube, with two axes of spatial information (the two dimensions of the imaging array) and one axis of Fourier transformed spectral information (the interferograms).

The collected information of the data cube is then input into processor 22. As shown in FIG. 1, processor 22 includes Fourier transform module 24, peak detector and notching module 26, spectral recombination module 28 and output formatting module 30. The collected data cube is input into Fourier transform module 24 and inverse Fourier transformed, spatial-point by spatial-point, to achieve a spectral data cube with two axes of spatial information, and one axis of spectral information. If spectral interference is absent, the spectral data cube may be formatted in module 30 into a video output signal which may be printed or displayed.

As shown in FIG. 1, however, spectral interference enters imaging system 10, due to radiation from laser 12, which may be oriented spatially as part of the target of interest, or separately from the target of interest. For example, laser 12 may be intentionally turned on, so that the laser emits a beam directed into image collection optics 16, in order to saturate the imaging focal plane and prevent imaging system 10 from reconstructing the scene imagery. The present invention advantageously provides counter-measures against such laser interference. As will be explained, the spectral data cube, formed in module 24, as a result of the laser energy is localized to a small region along the spectral axis and to a limited region along the two spatial axes.

By module 26 peak detecting the energy and notching the spectral region containing the laser illumination, the effect of the laser may be minimized or eliminated. Recombining the spectral information (collapsing the spectral dimension) into a single intensity value in module 28, then reconstructs the scene imagery without the image artifacts due to the laser energy.

It will be appreciated that the location of the laser spectral energy does not need to be known a priori. The inventors have discovered that the laser energy produces a very bright and very narrow spike in the spectral dimension, which may easily be detected by various thresholding and/or matched filtering. The spike may be easily separated from other scene information due to its narrowness, while intensity scene spectral features that may be similarly narrow do not have the intensity of the laser illumination. The "notching" performed by module 26 eliminates this very bright and very narrow region of the spectral dimension either by forcing the data values to zero or by interpolating across the region using values outside the region affected by the laser (in other words, interpolating between two data points disposed at opposite ends of the narrow region of the laser).

It will also be appreciated that the present invention may accommodate multiple lasers, even if at different wavelengths, since each laser may produce a corresponding signal spike in a localized region along the spectral dimension. The present invention, as exemplified in FIG. 1, may provide counter-measures against a CW laser beam and/or a pulsed laser beam. The peak detection method of the present invention scans the spectral dimension and notches out any bright narrow spike having a predetermined peak amplitude, thereby catching any and all laser interferences. Another embodiment of the present invention providing counter-measures against a pulsed laser beam will be described later with respect to FIG. 14.

Furthermore, in the illustrative embodiment shown in FIG. 1, imaging system 10 includes a two-dimensional detecting array, FPA 20, which may include, by way of example, a visible imager or a thermal imager. The present invention, however, may include any form of optical detectors that are spatially scan-able, as long as the dwell time at each point of the image is sufficient to permit the FTIS to create a complete interferogram from that spatial point.

The inventors also discovered that the FTIS advantageously spreads the spectral information across the collected interferogram(s), enhancing the apparent dynamic range of the imaging system. Post-processing of the collected interferogram(s) via Fourier transformation, and including a simple spectral notch, reconstructs the imagery without the saturation and image artifacts caused by laser energy incident upon the entrance aperture of the imaging system.

Figure 2:
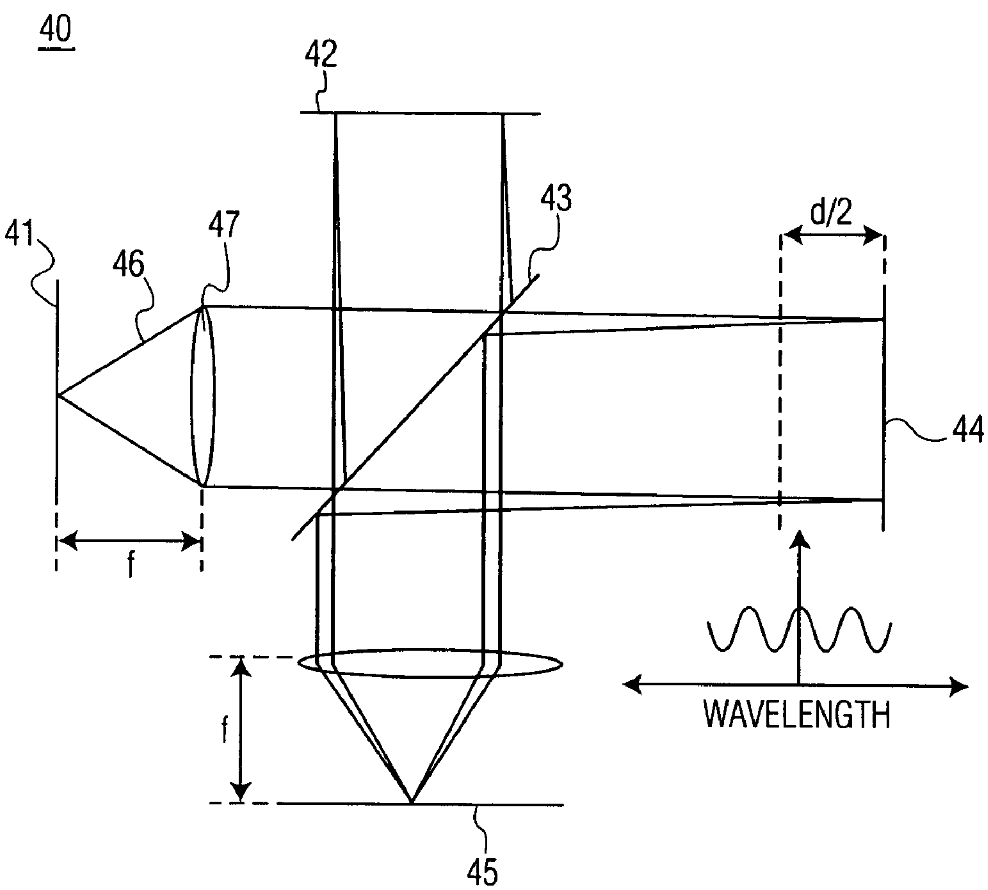
FIG. 2 is a pictorial representation of an exemplary spectrometer based on a Michelson interferometer configuration, as used in the imaging system of FIG. 1, in accordance with an embodiment of the present invention.

An exemplary type of spectrometer, such as an FTIS, is based on a Michelson interferometer configuration, as shown in FIG. 2. The FTIS relies on optical interference to construct an interferogram of the spectral energy in an optical beam by producing an interferogram at each point of a two-dimensional scene image. A Fourier transform spectrometer (FTS) is more limited in that it produces an interferogram at only a single point of the scene image. An FTS may include a single detector, as compared to an FTIS which may include multiple detectors, such as an FPA of detectors.

Referring to FIG. 2, there is shown FTS 40 including object plane 41 providing a source (input object) forming optical beam 46. The optical beam passes through input lens 47 and is split by beamsplitter 43. The optical beam is split into two beams that may, for example, be normal to one another. The direct (i.e., not reflected or bent) beam impinges on flat scan mirror 44 (may also be a retro reflector cube, for example) and is reflected back to beamsplitter 43. Similarly, the bent beam, which may be reflected 90 degrees, for example, from its original path by beamsplitter 43, is reflected back by flat fixed mirror 42.

Scan mirror (or reflector cube) 44 may be configured to move a distance d/2 in the direction of the direct beam, thereby varying a length of the direct beam's optical path. The reflected bent beam and the reflected direct beam may interfere when combined by beamsplitter 43. The combined beams may be output at image plane 45, which may be a single point of a detector, or a single point in a focal plane of an FPA (an FTIS configuration).

If the two optical paths for the direct and bent beams are nearly equal, interference fringes may be observed. The greater the difference of the paths, the more nearly monochromatic the light must be for observing any fringes. The fringes may shift due to the displacement of scan mirror (or reflector cube) 44 in time. The path difference between successive bright fringes may be $\lambda/2$, where $\lambda$ is the wavelength of the light source, and the passage of one bright fringe to a position previously occupied by an adjacent fringe implies a translation of scan mirror 44 by a distance of $\lambda/4$. Hence, path differences and distances within the spectrometer may is be determined from the fringe patterns. Stated differently, the optical interference effect used in an FTS is between an optical beam and a delayed version of that optical beam. By requiring the delayed optical beam to traverse a slightly longer optical path, it is then at a different phase relative to the un-delayed optical beam. In addition, the optical path is different for each wavelength, so this phase difference is a function of wavelength of the spectral energy distribution.

Re-combining these two beams causes them to interfere, producing an intensity that is a point on the cosine transform of the spectral energy distribution. Varying the optical path in the FTS traces out a continuous cosine transform of the spectral energy distribution. Sampling this function produces the interferogram, which may then be Fourier transformed back (or reverse Fourier transformed) into a measurement of the spectral energy distribution.

Referring to FIGS. 3A, 3B and 3C, there is shown a transformation of the input spectral radiance into interferograms, as produced by an FTS (or FTIS). FIG. 3A shows a plot of input spectral radiance versus spectral frequency. FIG. 3B shows a plot of spectral energy versus interferogram sample number.

FIG. 3C shows the point at which the scanning mirror introduces exactly the same phase delay as that experienced by the other beam and is known as the Zero-Path Difference (ZPD). This point along the interferogram is important because the interferogram value at the ZPD is proportional to the integrated spectral energy distribution. This value represents the totally constructive interference of all spectral wavelengths and is significantly larger than other values along the interferogram, where there is some constructive interference and some destructive interference at the various wavelengths.

The FTS (or FTIS) shown in FIG. 2 is based on a negligibly thin beamsplitter 43. More typically, a beamsplitter is made from a dielectric thin film structure that is deposited on a substrate. This substrate is relatively thick, so that it may provide structural support and stability to the dielectric thin film structure. Such a relatively thick beamsplitter is shown as element 57 mounted in FrS (or FTIS) 50 of FIG. 4. As shown, beamsplitter 57 includes dielectric thin film 54 sandwiched between first substrate 52 and second substrate 56.

As may be seen in FIG. 4, input beam 46 incident on fixed mirror 42 passes through first substrate 52 three times, whereas the beam incident on scanning mirror 44 only passes through first substrate 52 once. Since first substrate 52 has a refractive index that varies non-linearly with wavelength, a spectrally varying phase offset term is introduced. By providing second substrate 56 on the opposing side of first substrate 52, a compensated FTS (or FTIS) may be configured which corrects this effect.

The second substrate has an equivalent thickness to that of the first substrate. In this manner, both beams may pass through the same amount of optical thickness and, consequently, the phase offset may be cancelled. Still referring to FIG. 4, it may be seen that input beam 46 incident on fixed mirror 42 passes through second substrate 56 only once, whereas the beam incident on scanning mirror 44 passes through second substrate 56 three times (in other words, the paths of each beam through the compensated beamsplitter are equal to each other).

Figure 5A:
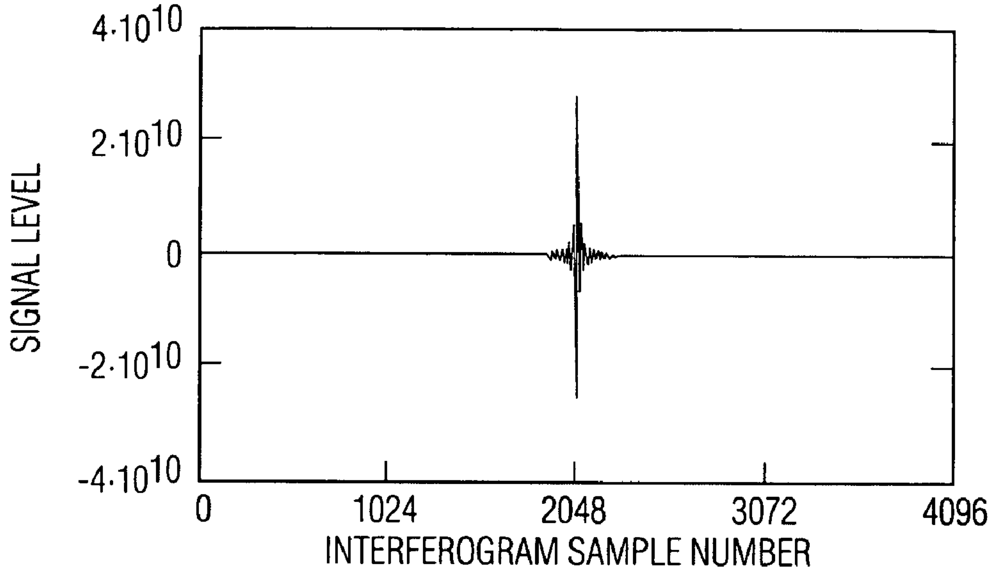
FIGS. 5A–5B are graphical plots of interferogram samples as constructed by the spectrometer of FIG. 2
Figure 5B:
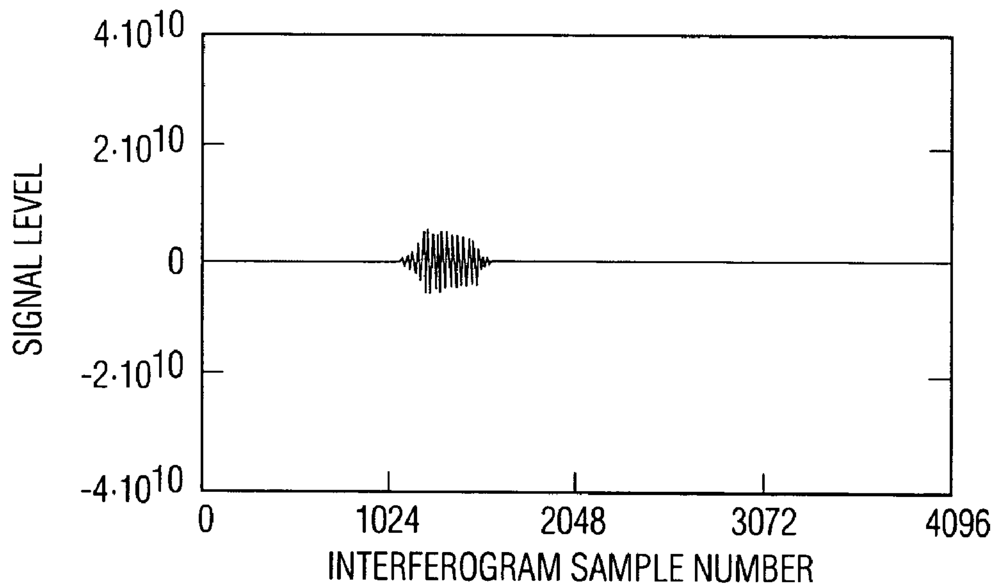

If a compensating plate (second substrate 56) is not included in the FTS (or FTIS) system, then the spectrally varying phase offset term causes the actual ZPD point to vary with wavelength. This effectively spreads the ZPD value along the interferogram. A comparison of interferograms from a compensated FTS (or FTIS), which includes the configuration shown in FIG. 4, and an uncompensated FTS (or FTIS), which only includes first substrate 52 and thin beamsplitter dielectric film 54 (without second substrate 56) is shown in FIGS. 5A and 5B, respectively. FIG. 5A depicts a narrow, clean and sharp ZPD formed in a compensated system. FIG. 5B, on the other hand, depicts a smeared and thick ZPD formed in an uncompensated system.

The imaging system of the present invention, as shown in FIG. 1, does not require any particular spectral region and may operate over any spectral region. In one exemplary embodiment, the longwave-infrared (LWIR) region was used for evaluation of the laser counter-measures (LCM) of the present invention. The evaluation used an 8–12.51 $\mu$m (800–1250 $cm^{-1}$) LWIR imaging system. For convenience, the laser chosen was a 10.6 $\mu$m laser ($CO_2$), although any other laser wavelength may have been used as well. The laser intensity was set to be a predetermined factor times the Planck blackbody radiation intensity at that wavelength.

The longwave-infrared (LWIR) blackbody spectral distribution is shown in FIGS. 6A and 6B. FIG. 6A shows the blackbody spectral frequency in $cm^{-1}$ (wavenumber) and FIG. 6B shows the blackbody spectral frequency in microns (wavelength). (Wavenumber is the inverse of wavelength.) A clipping level was set to be slightly wider than the nominal interferogram minimum and maximum signal levels, where the minimum and maximum signal levels are based upon a compensated FTS (or FTIS) processing a 293 K scene. These levels were set as follows:

$-2.6\times10^{11}$<nominal signal<$2.8\times10^{10}$ [293K scene, compensated FTS].

Clipping level set to $\pm3\times10^{10}$ [nominal signal is 90% of total range].

The present invention converted the monochromatic source (laser) into a nearly pure cosine in the interferogram. The source was spread uniformly across the interferogram, as shown in FIG. 7. As shown, the amplitude of this cosine depends on the laser power, but the laser energy is spread across all of the interferogram samples. This leads to a significant reduction in the amount of laser power at any given interferogram sample, reducing the effective dynamic range requirements for the detectors. The Zero Phase Delay (ZPD) spike also has a small dependence on the laser power.

Since the laser power is spread across all the interferogram samples, the imaging system of the present invention may accept significantly more laser energy before saturating its detectors. Also, the initial saturation effect produces a clipping of the ZPD spike, which modifies the reconstruction of the spectral content, but still allows reconstruction for non-radiometric uses (this is discussed later). Finally, since the laser energy is spread across all the interferogram samples, the resistance of imaging system 10 (FIG. 1) to the laser is primarily a function of the number of samples in the interferogram. Thus, using an FTS/FTIS to harden an imager against laser illumination is feasible.

The following is a discussion of the effectiveness of imaging system 10 of FIG. 1 in reducing or eliminating an interfering laser radiating into image collection optics 16. An example of the effectiveness of the system is shown in FIGS. 8A, 8B, 8C and 8D.

Figure 8A:
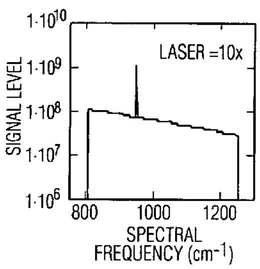

As shown, FIG. 8A includes the spectral radiant energy incident on imaging system 10. The incident energy includes the unwanted laser energy at 10.6 microns having an intensity which is ten times (10×) greater than the radiant energy of the target of interest (black body radiation which includes a spectral frequency of 800 to 1250 $cm^{-1}$. This is similar to a spectral range having wavelengths between 8 and 12.5 microns.

Figure 8B:
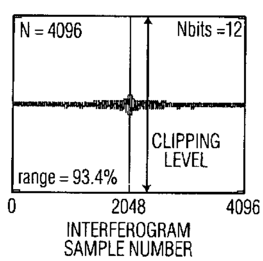

FIG. 8B shows the interferogram output from FTIS (FTS) 18 of FIG. 1. As may be seen, the interferogram baseline includes a "fuzz", relative to the nearly flat interferogram baseline of FIG. 3B. The interferogram includes 4096 points and is produced using a 12 bit quantization. Peak detector 26 of FIG. 1 provides a clipping level as shown in FIG. 8B. No clipping is experienced, however, with the input signal magnitude of FIG. 8A. It will be appreciated that the amount of clipping is based on a range of 100%. If the range is less than or equal to 100%, it implies no clipping. More specifically, in FIG. 8B the range is equal to 93.4% and, therefore, no clipping occurs.

Figure 8C:
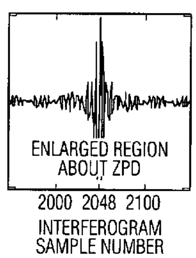
Figure 8D:
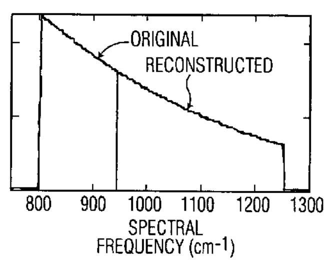

FIG. 8C is an enlargement of the ZPD region of FIG. 8B. FIG. 8D shows the original black body input signal and the reconstructed signal after the interferogram is Fourier transformed by module 24 and spectrally recombined by module 28 of FIG. 1. Note the notch of the laser energy in FIG. 8D, as performed by module 26.

It will be appreciated that the reconstructed signal in FIG. 8D may be an interpolation between two points of the spectral energy of the target of interest, that are located at opposite ends of the notched laser energy. This interpolation provides a smooth reconstructed curve with the notch taken out. The narrow spike produced by the laser is set to zero. The affect of the laser "notching" is clearly visible. More importantly, however, the scene signal has been reconstructed, almost perfectly, even with a laser power that is ten times the black body radiance at 10.6 microns.

The affect of increasing laser power is illustrated in FIGS. 9A–9P. As shown in FIGS. 9A, 9E, 9I and 9M, the laser power is increased from zero times (Ox) the incident scene energy to 10 times (10×), 50 times (50×) and 100 times (100×) the incident scene energy.

As shown in FIGS. 9B, 9F, 9J and 9N, increasing the laser power broadens the "fuzz" (the cosine term) across the interferogram baseline. As shown in FIGS. 9C, 9G, 9K and 90, the ZPD peak increases as the laser power is increased. As the laser power is increased, eventually the ZPD peak is clipped by the finite dynamic range of FPA 20. In FIG. 9B and FIG. 9F no clipping occurs. In FIG. 9J, the clipping is approximately 8% and in FIG. 9N, the clipping is approximately 26%.

When the clipping occurs, the reconstructions shown in FIGS. 9D, 9H, 9L and 9P, begin to deviate from the original spectral energy distribution. The present invention, however, advantageously eliminates the extremely bright laser spike. (Note, for example, FIG. 9A has a logarithmic scale, whereas FIG. 9D has a linear scale). Moreover, the present invention advantageously provides counter-measures against an unwanted interfering laser and demonstrates a resistance to the laser radiation that is 100 times (100×) the incident scene energy.

The reconstruction of the original spectral energy without the laser energy spike is shown in FIG. 9P and indicates that the laser has "confused" the reconstruction module, because some in-band scene energy seems to be missing (the reconstructed curve has a lower amplitude than the original curve). Referring to FIG. 10, however, an expanded scale of the reconstruction process indicates that the error in the reconstruction has not actually lost any energy. The energy has only been pushed further out into the outlying spectral regions. The reconstruction module has not lost signal energy. It has moved the signal energy to the wrong spectral location.

Although the reconstruction performed by modules 24, 26 and 28 has pushed out the energy into the wrong spectral location, nevertheless, the laser resistance performed by the present invention is very useful. An imager does not require spectral information and radiance data may be integrated into a panchromatic value (by spectral recombination module 28), even if the energy may normally be considered "out of band". Accordingly, the laser energy may be nulled out (or notched out), and the panchromatic scene may be reconstructed, with little significant affect on the overall imaging system's performance.

It will be appreciated that as the laser energy is increased, the cosine term in the interferogram due to the laser (shown as "fuzz" along the interferogram baseline) increases, until eventually it exceeds the clipping threshold. When this happens, the reconstruction rapidly begins to take on some odd structure and probably may no longer be recombined into a reasonable estimate of the panchromatic scene intensity.

Figure 11A:
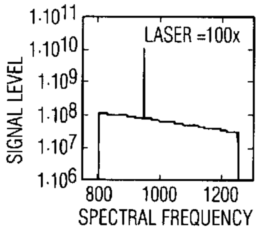
Figure 11B:
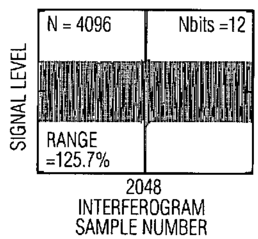
Figure 11C:
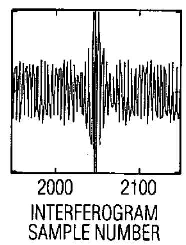
Figure 11D:
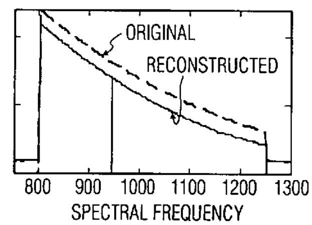
Figure 11E:
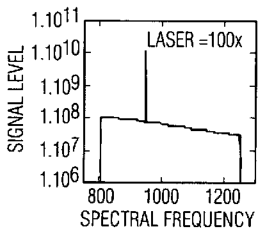
Figure 11F:
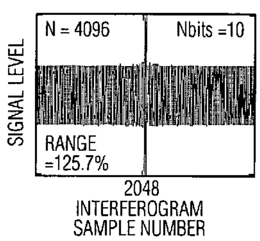
Figure 11G:
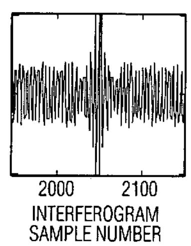
Figure 11H:
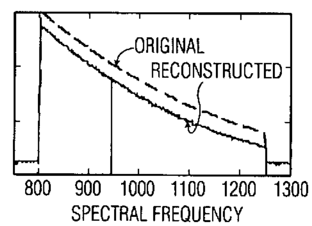
Figure 11I:
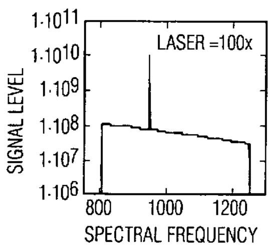
Figure 11J:
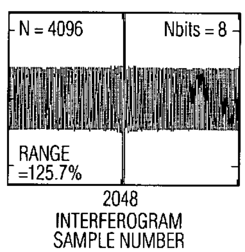
Figure 11K:
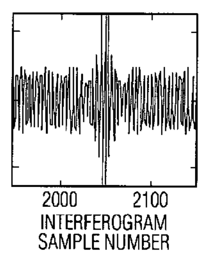

FIGS. 11A–11L show the effect of selecting different levels of quantization bits for the imaging system. As shown, FIG. 11B shows the effect of using a 12 bit quantization level. FIG. 11F shows the effect of using a 10 bit quantization level and FIG. 11J shows the effect of using an 8 bit quantization level.

Figure 11L:
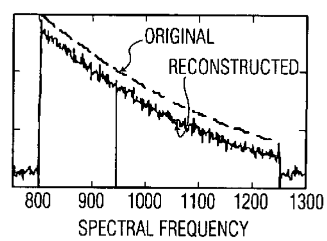

The laser power is kept constant, at a 100 times (100×) the incident scene energy, at 10.6 microns, as shown in FIGS. 11A, 11E and 11I. As expected, changing the number of quantization bits drives the noise present in the reconstructed signal, as shown in FIGS. 11D, 11H and 11L. On the other hand, it may be seen that the quantization level has essentially no affect on the laser counter-measure capability of the present invention. Even an imaging system with 8 bits of quantization exhibits the same laser resistance as a 12 bit imaging system. In addition, while the 8 bit reconstruction is noisy as compared to the reconstruction for finer quantization levels, much of the noise is averaged out when the reconstructed spectral energy is combined back into a single panchromatic value for the image (by spectral recombination module 28).

Figure 12A:
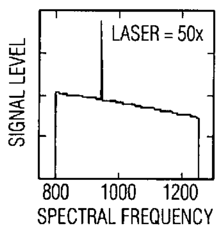
Figure 12B:
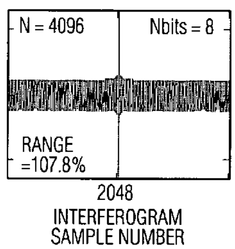
Figure 12C:
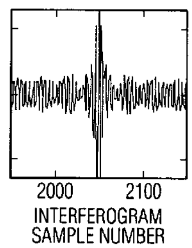
Figure 12D:
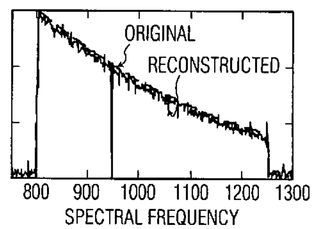
Figure 12E:
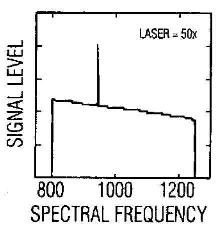
Figure 12F:
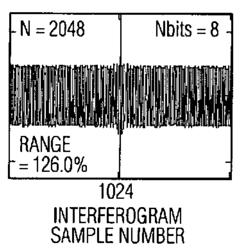
Figure 12G:
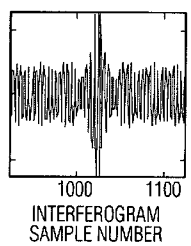
Figure 12H:
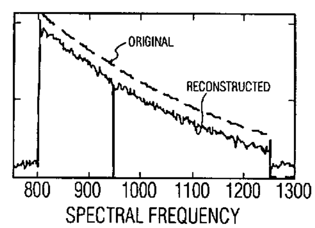
Figure 12I:
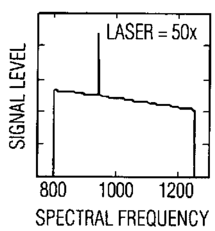
Figure 12J:
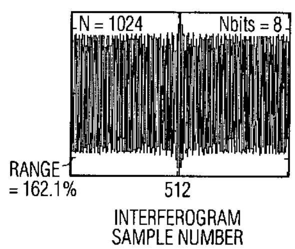
Figure 12K:
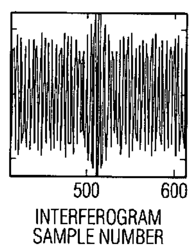

FIGS. 12A–12L show the effect of changing the number of samples in the interferogram. The input incident power is kept the same, as shown in FIGS. 12A, 12E and 12I. The input laser energy is also kept the same, at a level of 50 times (50×) the incident energy of the scene at 10.6 microns. FIG. 12B shows FTIS (FTS) 18 providing 4096 interferogram samples. FIG. 12F shows the FTIS (FTS) providing 2048 interferogram samples, and FIG. 12J shows the FTIS (FTS) providing 1024 interferogram samples.

It will be appreciated that reducing the number of samples in the interferogram implies a simpler FTIS (FTS). This is because reducing the number of interferogram samples leads to a shorter required motion of the scanning mirror.

Figure 12L:
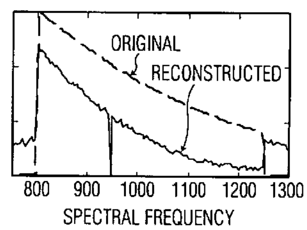

Fewer samples also reduces the data volume and the processing requirements. As shown in FIGS. 12D, 12H and 12L, fewer interferogram samples causes the reconstruction to deviate more from the original scene. The missed reconstructed energy is pushed into the "out of band" regions and is not lost, as may be seen in FIGS. 12H and 12L. Fewer interferogram samples causes the present invention to distort the reconstruction faster as compared to laser power, but it still exhibits the desired laser resistance.

FIGS. 13A–13L show the performance of the imaging system by comparing a compensated FTIS (FTS) performance to an uncompensated FTIS (FTS) performance. FIGS. 13A, 13B, 13C and 13D show performance of the imaging system using a compensated FTIS (FTS). FIGS. 13E, 13F, 13G and 13H, as well as FIGS. 13I, 13J, 13K and 13L, show performance of the imaging system using an uncompensated FTIS (FTS).

Figure 13A:
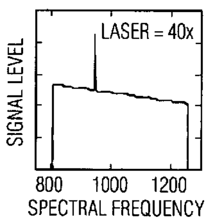
Figure 13B:
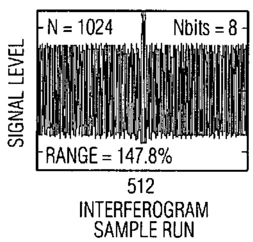
Figure 13C:
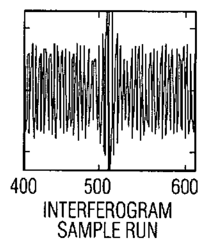
Figure 13D:
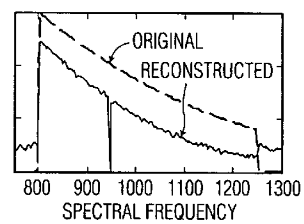
Figure 13E:
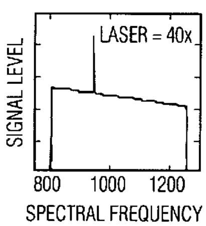
Figure 13F:
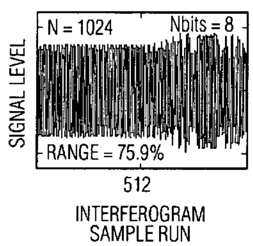
Figure 13G:
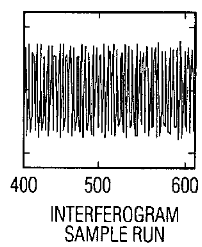
Figure 13H:
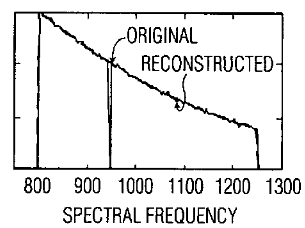
Figure 13I:
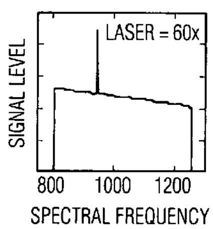
Figure 13J:
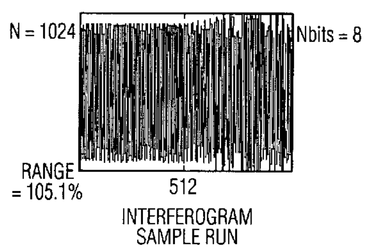
Figure 13K:
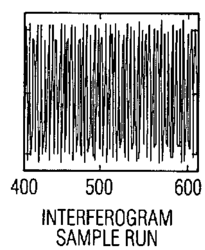
Figure 13L:
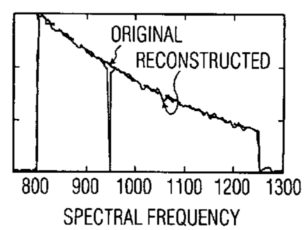

It will be appreciated that an uncompensated FTS (FTIS) offers some advantages. It is typically easier to build an uncompensated FTS (FTIS), because less precision is required in the beam splitter unit. In addition, when the system is uncompensated, the ZPD spike may be spread out and, therefore, less dynamic range is required to capture the interferogram. An uncompensated system also allows for a small increase in the amount of laser power rejection, perhaps as much as 50%, as shown in FIGS. 13H and 13L. The reconstructed scenes are similar to each other, although the input laser power is 40 times (40×) the incident energy as shown in FIG. 13E, and 60 times (60×) the incident energy as shown in FIG. 13I.

On the other hand, as noted previously, once the laser power is sufficiently high that the cosine term and the interferogram (fuzz) reach the clipping level of the imaging system, the reconstruction rapidly experiences significant distortions. Because of this, the uncompensated FTS (FTIS) shows little or no effect from the laser power, until the laser power drives the cosine term into clipping. After this point, reconstruction rapidly deteriorates.

This is in contrast to the compensated FTS (FTIS), which is slowly distorted as the laser power drives the ZPD more and more into clipping, up until the cosine term is also driven into clipping. After this point, the reconstruction rapidly deteriorates. Generally, the compensated FTS (FTIS) experiences a "soft" degradation in performance, as the laser power is increased, while the uncompensated FTS (FTIS) shows little effect until it suddenly degrades significantly (a "hard" degradation).

Referring now to FIG. 14, there is shown another imaging system for reducing or eliminating interference from unwanted laser illumination, where the interfering laser is a pulsed laser. The imaging system, generally designated as 70, includes elements that are similar to imaging system 10 of FIG. 1. Whereas imaging system 10 is best in eliminating or reducing interference from unwanted CW laser illumination, the imaging system of FIG. 14 is best in reducing or eliminating interference from unwanted pulsed laser illumination.

Imaging system 70 includes image collection optics 16, Fourier transformed imaging spectrometer 18, focal plane array (FPA) 20 and processor 72. Light from scene 14 is collimated by the collection optics into beam 17 and directed into FTIS 18. FTIS 18 converts the incoming scene energy into interferograms. These interferograms, as previously described, are directed into FPA 20. The collected information from FPA 20 is a data cube, with two axis of spatial information. The collected information is input into processor 72.

Different from processor 22 of FIG. 1, processor 72 includes peak detector and removal module 74 disposed between FPA 20 and Fourier transform module 24. Also included, as shown in FIG. 14, peak detector and removal module 76 is disposed between the output of Fourier transform module 24 and the input of spectral recombination module 28.

The pulse laser energy incident on FPA 20 may exhibit artifacts (anomalous or saturated values). The number of anomalous samples in an interferogram depends on the ratio of the interferogram sample rate to the laser pulse repetition rate (PRF). These anomalous or saturated values in the collected data cube may be eliminated, by detecting and then zeroing these samples and/or interpolating across these samples. One or more samples of the interferogram may be detected as having a threshold exceeding a predetermined value by peak detector and removal module 74. Once detected as exceeding the predetermined threshold value, each of these samples may be zeroed in value or interpolated across these samples.

It will be appreciated that FTIS 18 is not required and may be replaced by an FTS. Only multiple samples, over a pixel dwell time, to allow detection and elimination of the anomalous values are required. In this matter, over sampling in time may be used to mitigate the effect of a pulsed laser jammer.

After peak detection and removal of the interfering pulsed laser signal by module 74, the resulting data cube may then be inverse Fourier-transformed, spatial point by spatial point, by way of Fourier transform module 24. The inverse Fourier transformation achieves a spectral data cube with two axes of spatial information and one axis of spectral information.

The inventors have discovered that placing a peak detector and removal module, such as module 74, immediately after FPA 20, is effective against pulsed lasers of arbitrary energy (short of damage thresholds) and pulse repetition frequencies of up to a significant fraction of the sampling rate of the FTS/FTIS interferometer.

For pulsed laser interference, the interferometer (FTS or FTIS) spreads the input energy across time (time domain), since the interferogram is scanned (internal to the interferometer) and sampled in time. For a short pulse of high energy, one interferogram sample may be saturated or at least corrupted. The redundancy inherent in the interferogram, however, allows recovery of the spectrum, as long as the saturated or corrupted sample is detected and removed. Such removal may be performed by peak detector and removal module 74. Because the saturated sample is significantly out-of-family with respect to its surrounding samples, it is easily detectable. Removal involves either nulling the sample (setting it to zero), or interpolating across the sample using nearest neighbor algorithms.

Peak detection and removal prior to inverse Fourier transformation mitigates interference from the pulsed laser, because the pulsed laser only affects a finite number of samples in the interferogram. As discussed above, the number of samples corrupted depends on the ratio of the sampling rate of the interferometer to the pulse repetition rate of the laser.

The redundancy inherent in the interferogram allows recovery of the spectrum, as shown in FIG. 15A through FIG. 15D. FIG. 15A is an exemplary scene without a pulsed laser interference. FIG. 15B is the interferogram of the same scene corrupted by a high PRF laser. After peak detection and removal of the high PRF interfering laser, by module 74 (the first module), the spectral intensity of the scene coupled with some remaining laser energy is shown in FIG. 15C. After peak detection and removal of the remaining laser energy, by module 76 (the second module), the original scene may be reconstructed as shown in FIG. 15D. As shown, the reconstructed scene is very similar to the original scene without any pulsed laser interference.

The second peak detector and removal module 76 may be similar or identical to peak detector and notching module 26 of FIG. 1. After the inverse Fourier transformation by module 24, the resulting spectral distribution (spectrum) is inputted into module 76. Module 76 may then detect any interference exceeding a predetermined threshold value, in the spectral domain, and then notch out, or set to zero in the spectral domain such interference from the pulsed laser. The notched spectral distribution may then be inputted into spectral recombination module 28, which may perform an interpolation between the notched portion by smoothing between two spectral points. As another alternative, spectral recombination module 28 may perform an integration across multi-spectral points (integration in the spectral domain) to provide a single panchromatic intensity. (This alternative, of course, is also applicable to the spectral recombination module 28 of FIG. 1).

The imaging system of FIG. 1 or FIG. 14 requires a large amount of signal processing. As an example, assume that FPA 20 includes a 512×512 imager array and FTIS 18 produces a 256 sample interferogram at each spatial sample. This represents about 67 million samples of data which must be processed for every frame of imagery. In addition, each interferogram (there are $512^2$=262 thousand interferograms) must be Fourier transformed by module 24. The laser energy must be isolated and notched out by module 26, and the remaining spectral data must be combined into a scene radiance estimate for every spatial point by module 28.

This amount of processing may be achieved by a massively parallel system. Optical matrix-vector processors have been in development for 25 years, and are starting to achieve product status. One example is the EnLight256 Optical DSP. This device may be programmed to provide one 128-element DFT every 8 ns, or one 256-sample interferogram in 32 ns (i.e., one interferogram may be transformed every 32 ns). The entire 512×512 array of interferograms may, therefore, be processed in about 8.4 ms. An EnLight256-based FTIS/LCM system may keep up with a 512×512 imager generating 256-sample interferograms at up to 120 Hz frame rate.

The remaining processing of laser spike detection and nulling in module 26 (FIG. 1) or modules 74 and 76 (FIG. 14), recombination into a panchromatic intensity image in module 28, and output formatting in module 30 likely require less processing, when compared to the processing required for Fourier transformation, and may easily be accommodated by a standard DSP.

An alternative to the EnLight may be a similar level of processors such as DSPs and field programmable gate arrays (FPGAs).

Although illustrated and described herein with reference to certain specific embodiments, the present invention is nevertheless not intended to be limited to the details shown.

Rather, various modifications may be made in the details within the scope and range of equivalents of the claims and without departing from the spirit of the invention.

What is claimed:

1. A system for imaging an object of interest comprising:
an optical detector for providing an output signal, in response to detecting the object of interest,
a spectrometer, disposed between the object of interest and the optical detector, for providing interferograms of the object of interest to the optical detector, and
a processor for processing the output signal from the optical detector,
wherein the spectrometer is configured to provide interferograms of an interfering signal, and
the processor is configured to reduce a level of the interfering signal, based on the interferograms of the object of interest and the interfering signal.

2. The system of claim 1 wherein
an image collecting optical device is disposed between the spectrometer and the object of interest,
the image collecting optical device is configured to collect optical energy of the target of interest and the interfering signal, and to provide the collected optical energy to the spectrometer.

3. The system of claim 1 wherein
the processor includes a Fourier transform module for converting the output signal provided by the optical detector into a spectral band of data.

4. The system of claim 3 wherein
the processor includes a peak detector and notching module for detecting and notching a region of the spectral band of data, the region including the interfering signal.

5. The system of claim 4 wherein
the peak detector and notching module is configured to detect an amplitude level in the spectral band of data that is greater than a predetermined threshold value, and
the peak detector and notching module is configured to notch the region of the spectral band of data, after the peak detector detects the amplitude level exceeding the predetermined threshold value.

6. The system of claim 3 wherein
the processor includes a spectral recombination module for integrating the spectral band of data into a single panchromatic intensity.

7. The system of claim 1 wherein the interfering signal is an optical laser beam.

8. The system of claim 7 wherein the laser beam is at least one of a CW laser signal and a pulsed laser signal.

9. The system of claim 1 wherein
the spectrometer includes a beam splitter for splitting an optical beam into two beams, and
the beam splitter is one of a compensating type and an uncompensating type.

10. In an imaging system providing an image of a target of interest, a method of reducing interference from a laser beam including the steps of:
(a) receiving optical energy from the target of interest and the laser beam;
(b) forming an interferogram of spectral energy, at each spatial position of an image, based on the optical energy received in step (a);
(c) detecting the interferogram of spectral energy, at each of the spatial positions, to provide a corresponding spectral band of intensity values;
(d) selecting an intensity level in the spectral band, detected in step (c), that is greater than a predetermined value, and reducing the selected intensity level; and
(e) forming an image of the target of interest, after reducing the selected intensity level of step (d).

11. The method of claim 10 wherein
step (b) includes forming an interferogram of spectral energy at each spatial position of a focal plane array (FPA), and
step (e) includes forming the image at each of the spatial positions of the FPA.

12. The method of claim 10 wherein
after detecting the interferogram of spectral energy, Fourier-transforming the interferogram into the spectral band of intensity values.

13. The method of claim 10 wherein
step (d) includes peak detecting the intensity level in the spectral band, and
notching out the detected intensity level in the spectral band.

14. The method of claim 13 including
interpolating between values of the spectral band disposed at opposite ends of the notched intensity level.

15. The method of claim 10 wherein
step (a) includes collecting optical energy of the target of interest and the laser beam, and
step (b) includes receiving the collected optical energy to form the interferogram.

16. The method of claim 10 wherein
step (a) includes receiving optical energy from the target of interest having a spectral band of approximately 8.0 to 12.5 microns and the laser beam having a wavelength of approximately 10.6 microns.

17. The method of claim 10 wherein
step (a) includes receiving the optical energy from the laser beam that is at least 10 times greater than optical energy received from the target of interest, at corresponding wavelengths.

18. The method of claim 10 wherein
step (b) includes forming the interferogram of spectral energy based on the received optical energy from the target of interest, and
spreading the received optical energy from the laser beam across the interferogram.

19. A method of providing counter-measures against an interfering optical source, the method comprising the steps of:
(a) receiving first energy from a desired optical source and second energy from an interfering optical source;
(b) constructing an interferogram from the first energy and second energy;
(c) detecting the second energy based on the constructed interferogram; and
(d) separating the detected second energy from the first energy.

20. The method of claim 19 wherein
step (d) includes performing an inverse Fourier transform on the constructed interferogram to obtain a spectral region of the second energy, and
removing the spectral region of the second energy using a notch filter.

21. The method of claim 20 wherein
after removing the second energy, interpolating across the spectral region to reconstruct spectral intensities of the first energy, and outputting the reconstructed spectral intensities of the first energy, as a desired signal output.

22. The method of claim 19 wherein step (a) includes receiving the first energy from a target of interest and receiving the second energy from an interfering laser beam.

23. The method of claim 19 including after constructing the interferogram from the first energy and second energy, removing at least one sample in the interferogram due to the second energy using a first notch filter, performing an inverse Fourier transform on the constructed interferogram after removal of the at least one sample of the second energy, and removing a spectral region of the second energy using a second notch filter.

* * * * *